(12) United States Patent
Cornic et al.

(10) Patent No.: US 12,405,369 B2
(45) Date of Patent: Sep. 2, 2025

(54) RADAR IMAGING METHOD, AND RADAR IMPLEMENTING SUCH A METHOD

(71) Applicant: THALES, Courbevoie (FR)

(72) Inventors: Pascal Cornic, Brest (FR); Renan Le Gall, Brest (FR); Rodolphe Cottron, Merignac (FR); Yoan Veyrac, Merignac (FR)

(73) Assignee: THALES, Courbevoie (FR)

( * ) Notice: Subject to any disclaimer, the term of this patent is extended or adjusted under 35 U.S.C. 154(b) by 569 days.

(21) Appl. No.: 17/762,370

(22) PCT Filed: Sep. 24, 2020

(86) PCT No.: PCT/EP2020/076774
§ 371 (c)(1),
(2) Date: Mar. 22, 2022

(87) PCT Pub. No.: WO2021/058674
PCT Pub. Date: Apr. 1, 2021

(65) Prior Publication Data
US 2022/0390592 A1  Dec. 8, 2022

(30) Foreign Application Priority Data
Sep. 26, 2019 (FR) ....................... 1910613

(51) Int. Cl.
*G01S 13/89* (2006.01)
*G01S 13/02* (2006.01)

(52) U.S. Cl.
CPC ....... *G01S 13/89* (2013.01); *G01S 2013/0254* (2013.01)

(58) Field of Classification Search
CPC .......... G01S 13/89; G01S 2013/0254
See application file for complete search history.

(56) References Cited

U.S. PATENT DOCUMENTS

| | | | | |
|---|---|---|---|---|
| 4,996,532 A | * | 2/1991 | Kirimoto | ........... G01S 7/36 342/17 |
| 7,994,969 B2 | * | 8/2011 | Van Caekenberghe | ........... G01S 13/536 342/107 |

(Continued)

FOREIGN PATENT DOCUMENTS

| | | |
|---|---|---|
| EP | 1351333 A2 | 10/2003 |
| EP | 3460505 A1 | 3/2019 |
| WO | 2021058674 A1 | 4/2021 |

OTHER PUBLICATIONS

Foreign Communication from a Related Counterpart Application, International Search Report dated Dec. 1, 2020, International Application No. PCT/EP2020/076774 filed on Sep. 24, 2020.

(Continued)

*Primary Examiner* — Marcus E Windrich
(74) *Attorney, Agent, or Firm* — Conley Rose, P.C.

(57) ABSTRACT

A radar imaging method using an active antenna comprising N transmission channels and M reception channels, transmitting in bursts of pointing cycles, is disclosed. The antenna covers a given angular range during a detection time unit of duration T, said time unit corresponds to a burst in which the N transmission channels are focused successively in a number $D_e$ of pointing directions (di) such that:
- the pointing direction on transmission (di) is modified from recurrence to recurrence;
- each time unit of duration T comprising a periodic repetition of a number C of identical pointing cycles, each of these cycles comprising a number P of recurrences, the set of these P recurrences covers the $D_e$ pointing directions (di);
- at least one beam is formed in reception on each recurrence in a direction included in the angular range (Continued)

Figure 1:
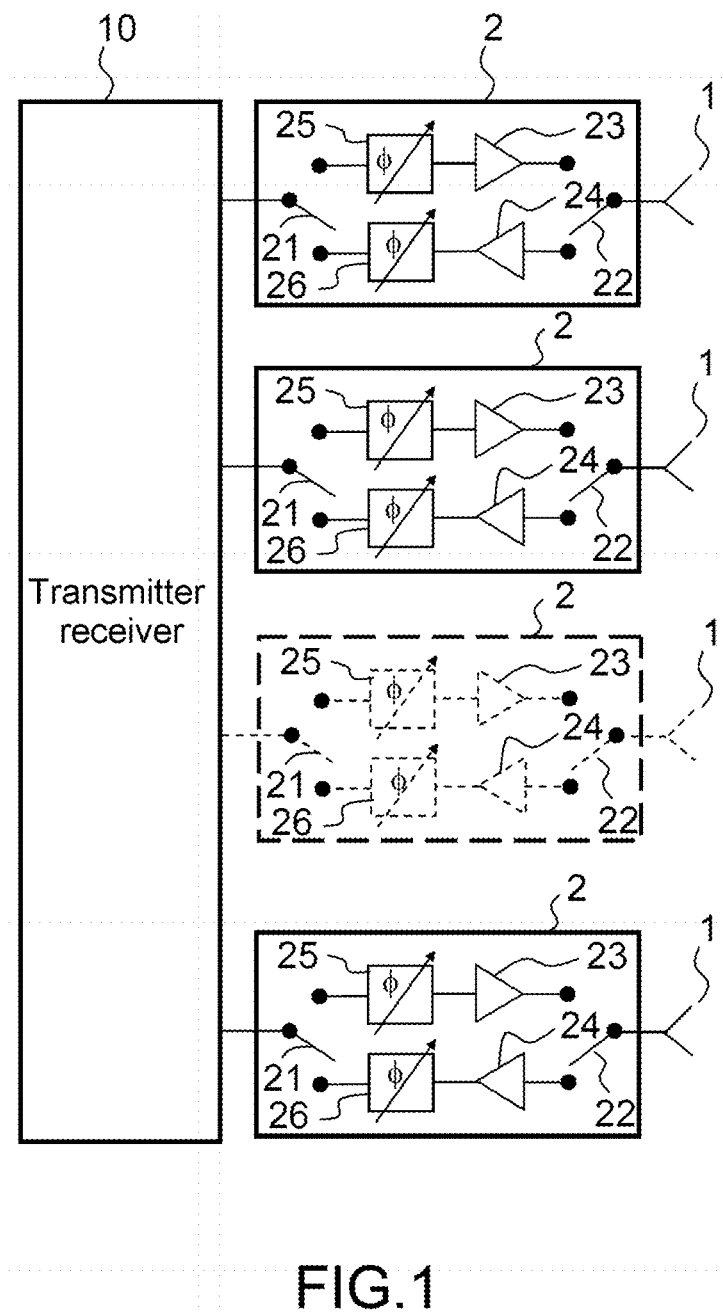

focused on transmission in the pointing direction corresponding to said recurrence.

11 Claims, 11 Drawing Sheets

(56) References Cited

U.S. PATENT DOCUMENTS

| | | | |
|---|---|---|---|
| 9,715,609 B1* | 7/2017 | Fink | H01Q 25/00 |
| 2004/0178943 A1* | 9/2004 | Niv | G01S 13/935 |
| | | | 342/191 |
| 2010/0253574 A1* | 10/2010 | Mizutani | H01Q 3/2605 |
| | | | 342/372 |
| 2016/0139254 A1* | 5/2016 | Wittenberg | G01S 13/343 |
| | | | 342/27 |
| 2018/0166795 A1* | 6/2018 | Pruett | H01Q 3/22 |
| 2019/0064338 A1* | 2/2019 | Holt | H01Q 1/525 |
| 2021/0067978 A1* | 3/2021 | Cheraghi | H04B 17/336 |
| 2021/0092702 A1* | 3/2021 | Kenington | H04B 7/06 |
| 2023/0417893 A1* | 12/2023 | Cornic | G01S 13/89 |

OTHER PUBLICATIONS

Foreign Communication from a Related Counterpart Application, Written Opinion dated Dec. 1, 2020, International Application No. PCT/EP2020/076774 filed on Sep. 24, 2020.

* cited by examiner

RADAR IMAGING METHOD, AND RADAR IMPLEMENTING SUCH A METHOD

CROSS-REFERENCE TO RELATED APPLICATIONS

The present application is a filing under 35 U.S.C. 371 as the National Stage of International Application No. PCT/EP2020/076774, filed Sep. 24, 2020, entitled "RADAR IMAGING METHOD, AND RADAR IMPLEMENTING SUCH A METHOD," which claims priority to French Application No. 1910613 filed with the Intellectual Property Office of France on Sep. 26, 2019, both of which are incorporated herein by reference in their entirety for all purposes.

The invention lies within the field of active antenna radars, and more particularly radars intended to cover a given solid angle with high angular discrimination. In the applications that are targeted, the aim is to produce an image of a different scene, corresponding to a given angular sector, using multiple relatively fine antenna beams making it possible to angularly separate the various objects present in the field of view of the radar.

The invention can be implemented by a radar installed on a fixed structure or on a moving structure. However, a preferential application concerns the radars on moving platforms, for example the radars that make it possible to display landing runways on line aircraft performing a function of EVS (Enhanced Vision System) type or even automobile radars for the anticollision or imaging functions intended notably for the future "driverless vehicle". More generally, the possible fields of application of the invention are, for example:

- landing assistance for airplanes (see EVS above);
- obstacle avoidance radars for piloted or unpiloted aircraft;
- anticollision radars for vehicles on the ground: automobiles, rail convoys, terrestrial drones, in particular.

One problem to be dealt with is to present an image of the scene present across all the field of view of a radar almost instantaneously and with high angular resolution, while limiting the digital processing requirements necessary to ensure this function. This capacity is particularly advantageous on a carrier moving rapidly with respect to the scene to be observed, or when the scene itself changes rapidly, or even when both these conditions are simultaneously combined.

To produce an instantaneous image of all of an observed scene, it is necessary in an angular scanning radar to temporally realign the detections obtained in the different successive directions targeted. Such realignments can be complex to implement and require recourse to an inertial unit in the presence of stray movements of the carrier of the radar to compensate for these movements. Even after such compensations, conformity faults can persist because of the non-stationary nature of the scene during the time required for the observation.

In the prior art solutions, to obtain the desired result, the conventional mechanical or electronic scanning solutions implementing a narrow beam to scan the field of observation are unsuitable, because of the cycle time required to refresh the information.

The solutions based on beam forming by computation, implementing a transmission by a single wide-field antenna and a multichannel array antenna in reception allow an instantaneous observation of the angular range, but suffer from low angular discrimination, because of the lack of selectivity of the transmission antenna. These solutions can also require a transmitter of high power, given the low antenna gain on transmission. This transmitter can make implementation complex or even impossible, depending on the application and the operating frequency of the radar.

Other solutions, of MIMO (Multiple Input Multiple Output) type, associating several transmission channels and several reception channels are possible. In this case, there are N transmission channels and M reception channels, and the individual transmission power can remain modest. However, the radar processing has to be applied to all of these N×M channels, which can require an extremely great computation volume, in particular for a real-time application. This may be out of reach for reasons of cost, of integration and of consumption. Also, in a MIMO radar, the separation of the transmission channels is performed in reception, which requires the orthogonality of the signals from the various transmitters not only on transmission, but also after reflection on the targets. This can be difficult to obtain, depending on the transmitted waveform, the disposition of the transmission and reception antennas, in particular the diffuse echoes such as ground clutter and when the antenna array has gaps in transmission or in reception, which is generally the case.

A particular case of MIMO modulation is known as DDMA (Doppler Division Multiple Access). The principle consists in performing, for each transmission channel, a linear phase modulation from pulse to pulse which is equivalent to a doppler modulation on transmission. The orthogonality of the transmission channels is obtained over the duration of a burst comprising a great number of recurrences, the received signals being situated in different doppler frequency bands depending on the transmitter concerned.

In such a method, the doppler modulation frequencies are different for each transmission channel and are multiple integers of the frequency of recurrence Fr of the radar, divided by the number of transmitters N. Moreover, the modulation frequencies increase linearly along the antenna array, which amounts to performing a regular electronic scan of the field of observation from pulse to pulse. Thus, for the first transmitter $TX_1$, the modulation frequency is 0, for the next transmitter $TX_2$ the modulation frequency is Fr/N, for the transmitter $TX_i$ the frequency is iFr/N, and for the transmitter $TX_N$, the frequency is (N−1)Fr/N. It should be noted that this principle does not apply in the context of an angular scan on two planes.

In this method, the separation of the signals of the different transmission channels is obtained by doppler filtering in reception and is consequently limited by the spectral width occupied by the radar echoes in the doppler range. Moreover, this solution involves forming transmission beams on reception, and the computation volume increases directly with the number of beams formed, which reduces the possibilities of creating a number of beams greater than the number of transmission channels, the computation resources often being limited.

One aim of the invention is notably to resolve the technical problem set out above. To this end, the subject of the invention is a radar imaging method using an active antenna comprising N transmission channels and M reception channels, transmitting in bursts of pointing cycles, said antenna covering a given angular range during a detection time unit of duration T, said time unit corresponding to a burst in which the N transmission channels are focused successively in a number $D_e$ of pointing directions such that:

- the pointing direction on transmission is modified from recurrence to recurrence;

each time unit of duration T comprising a periodic repetition of a number C of identical pointing cycles, each of these cycles comprising a number P of recurrences, the set of these P recurrences covers the $D_e$ pointing directions;

at least one beam is formed in reception on each recurrence in a direction included in the angular range focused on transmission in the pointing direction corresponding to said recurrence, the set of C cycles constituting a detection block of duration T.

In one possible implementation, during a pointing cycle, the number of pointings on transmission in a direction is adjusted as a function of the range required in that direction.

Also a subject of the invention is an active antenna radar comprising a number N of transmission channels and a number M of reception channels, capable of implementing this method.

Figure 2:
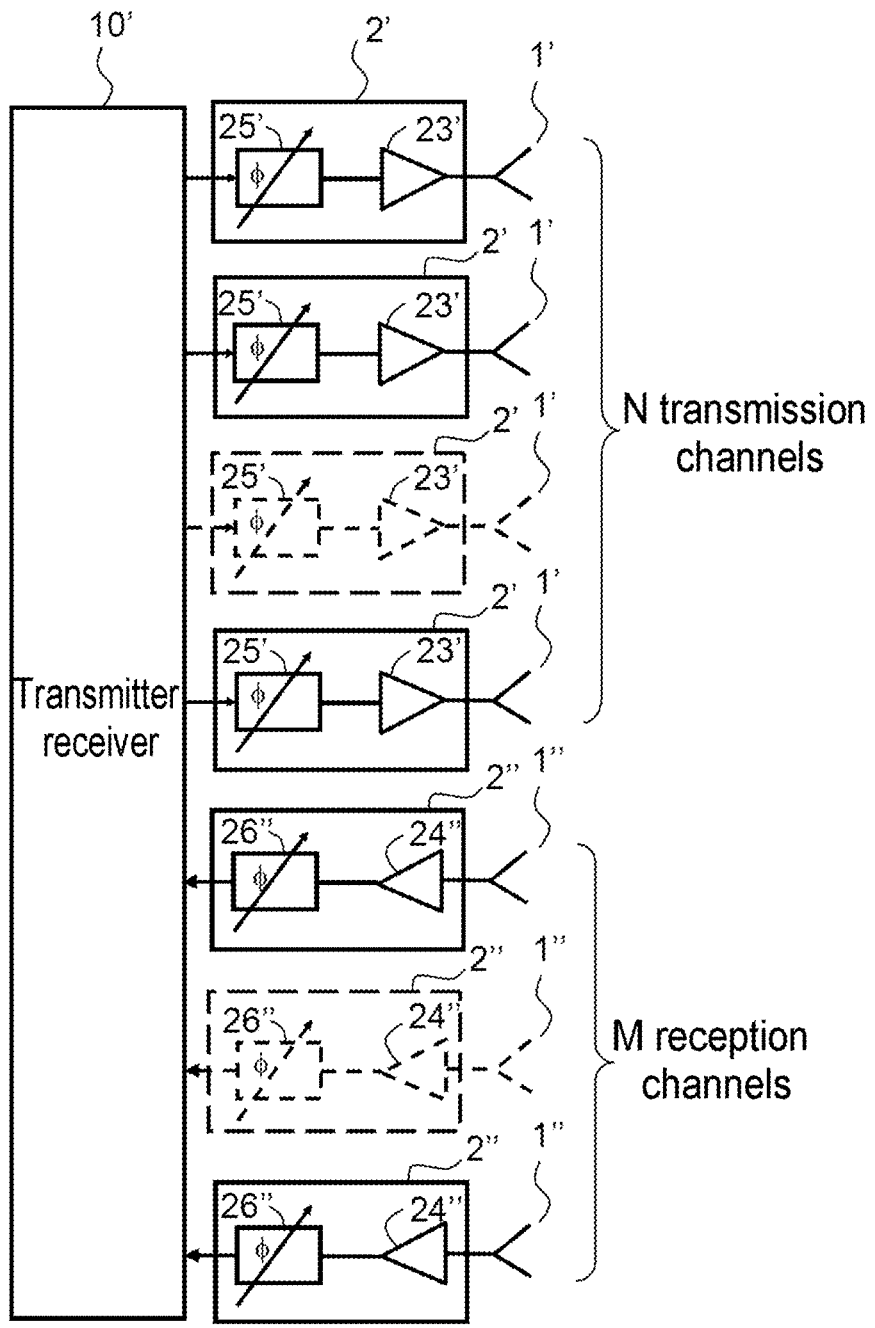
Figure 3A:
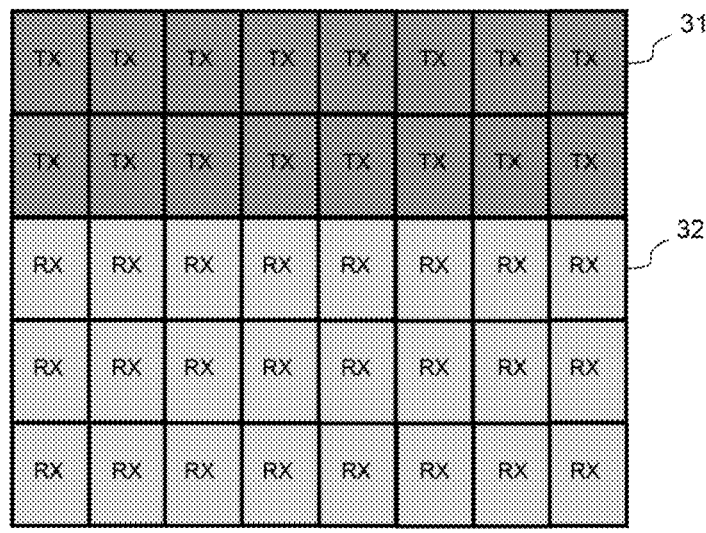
Figure 3B:
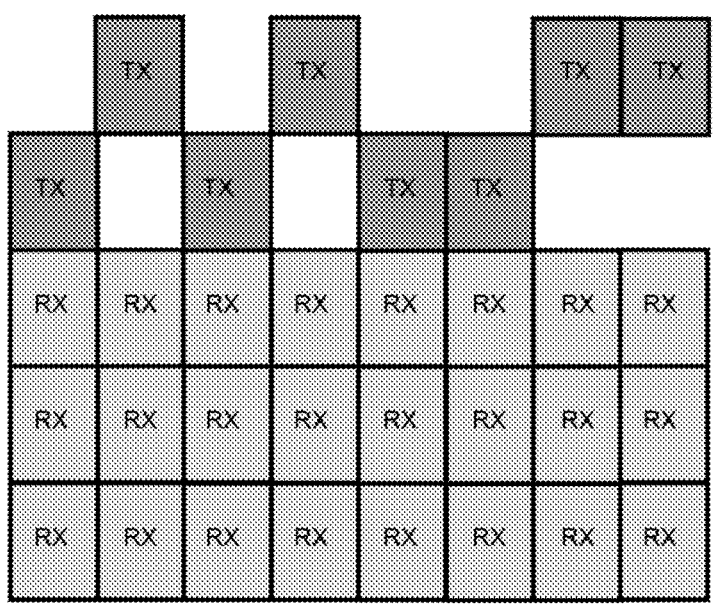
Figure 3C:
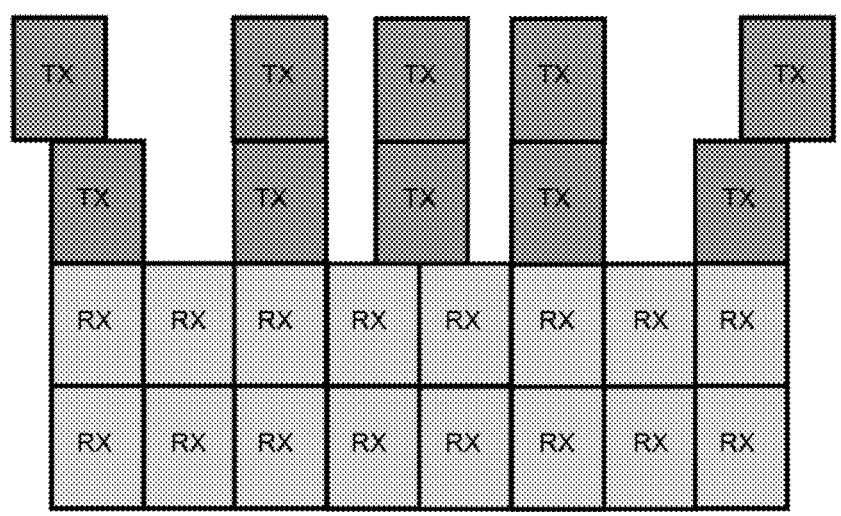
Figure 3D:
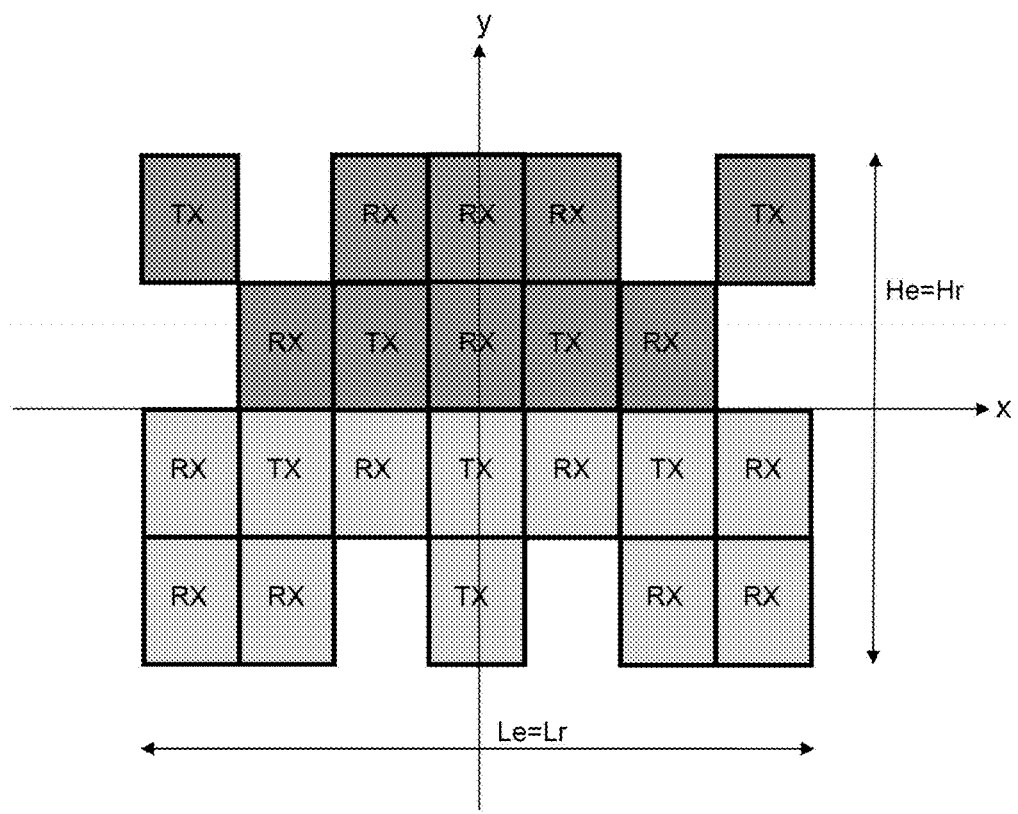
Figure 4:
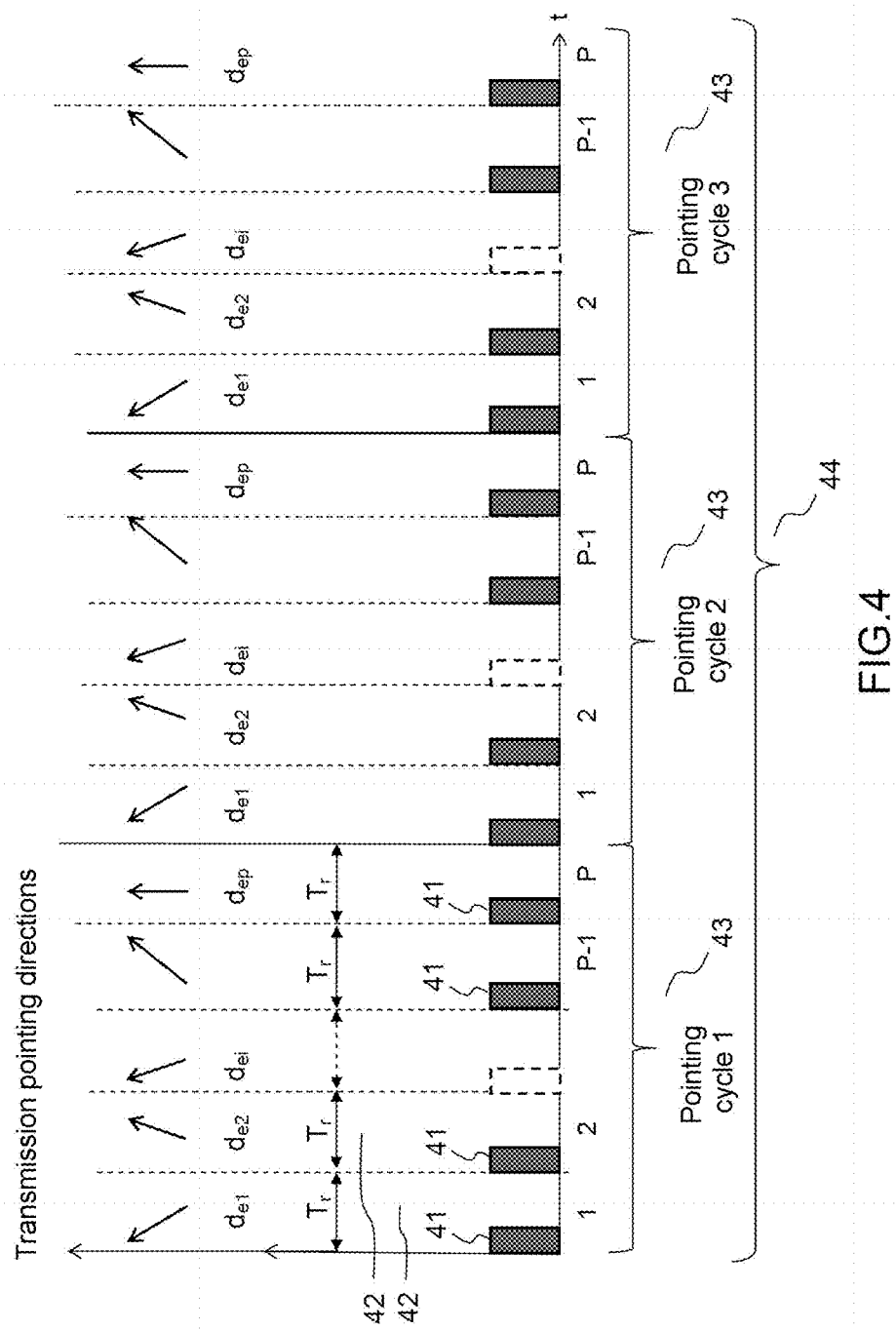
Figure 5A:
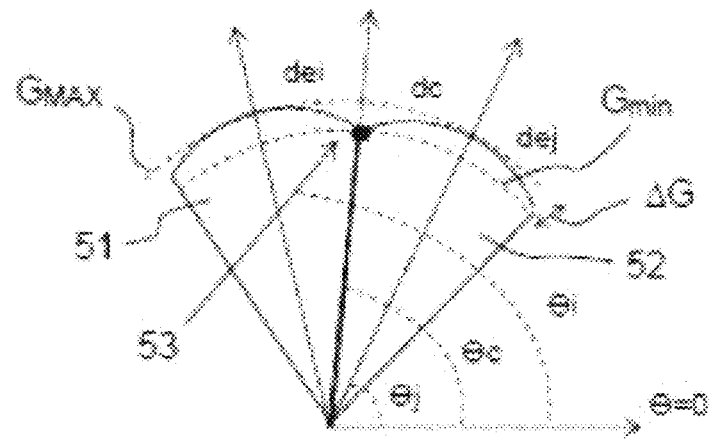
Figure 5B:
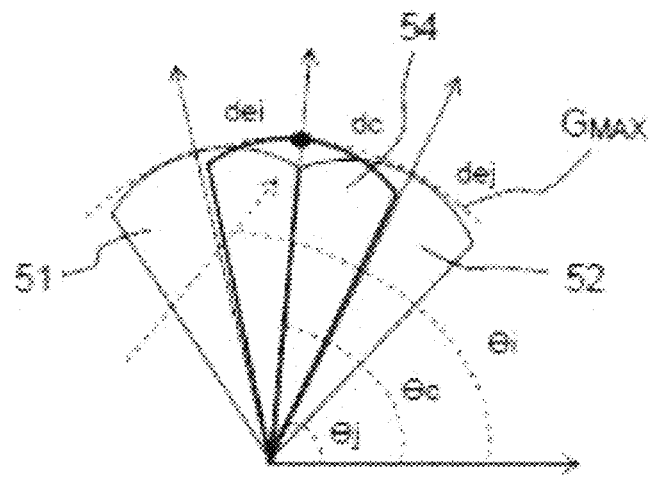
Figure 6A:
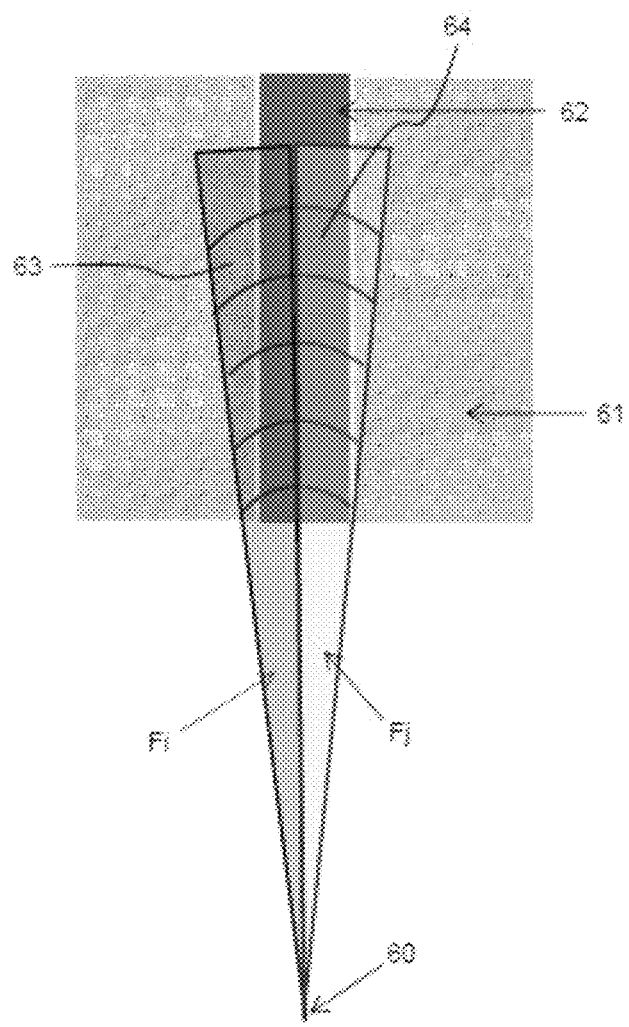
Figure 6B:
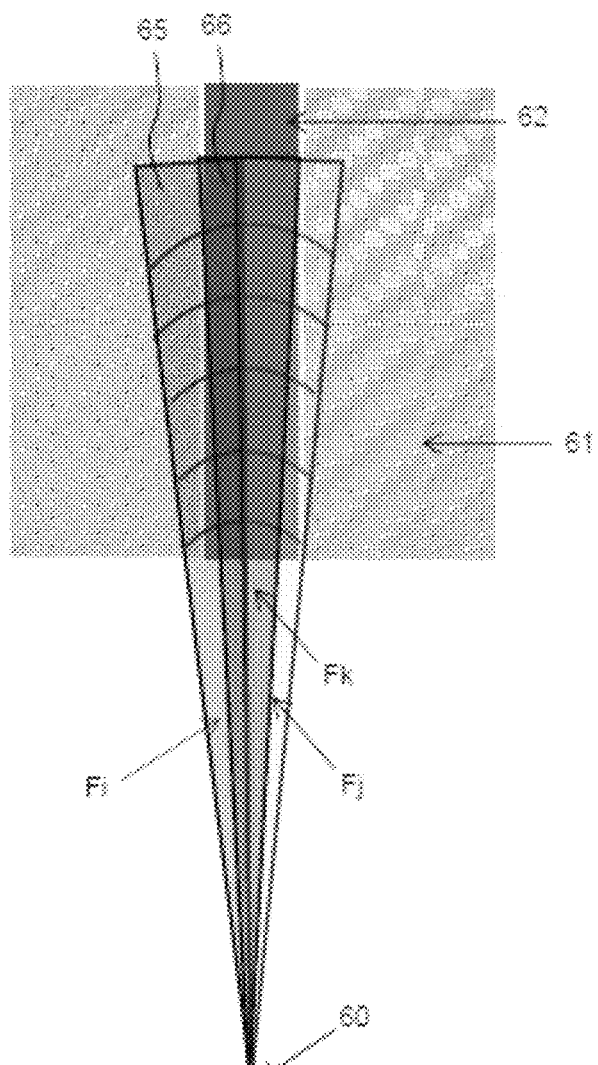
Figure 7:
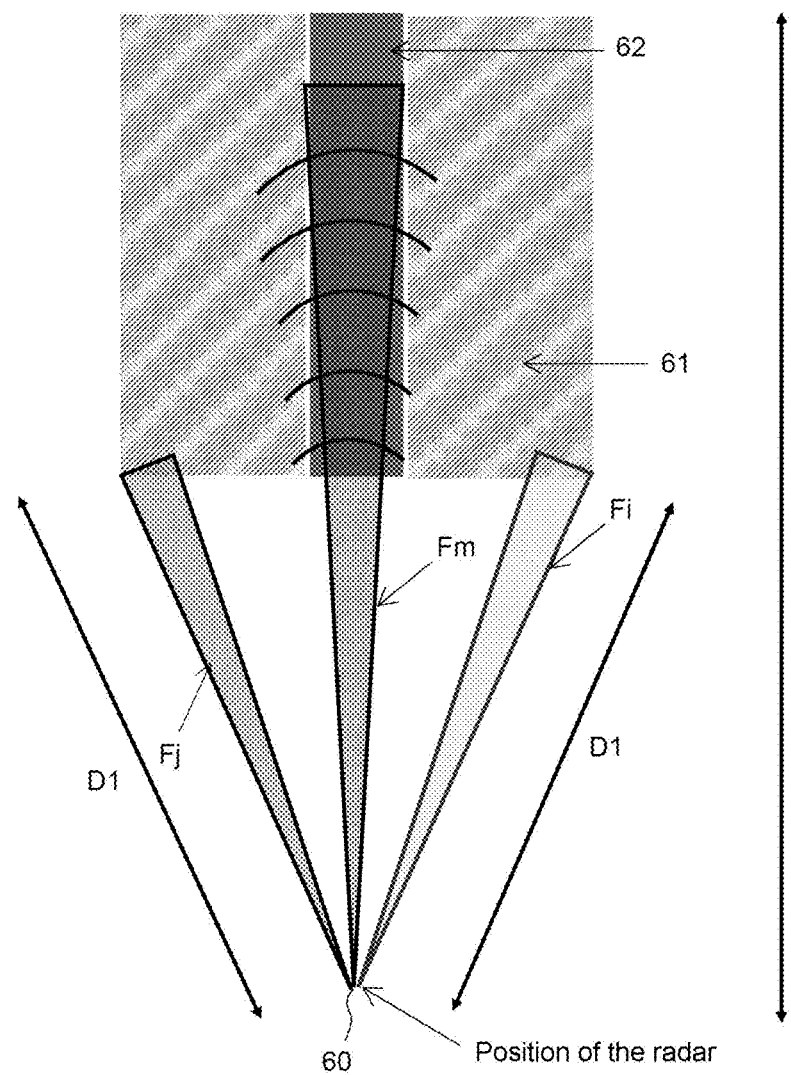
Figure 8:
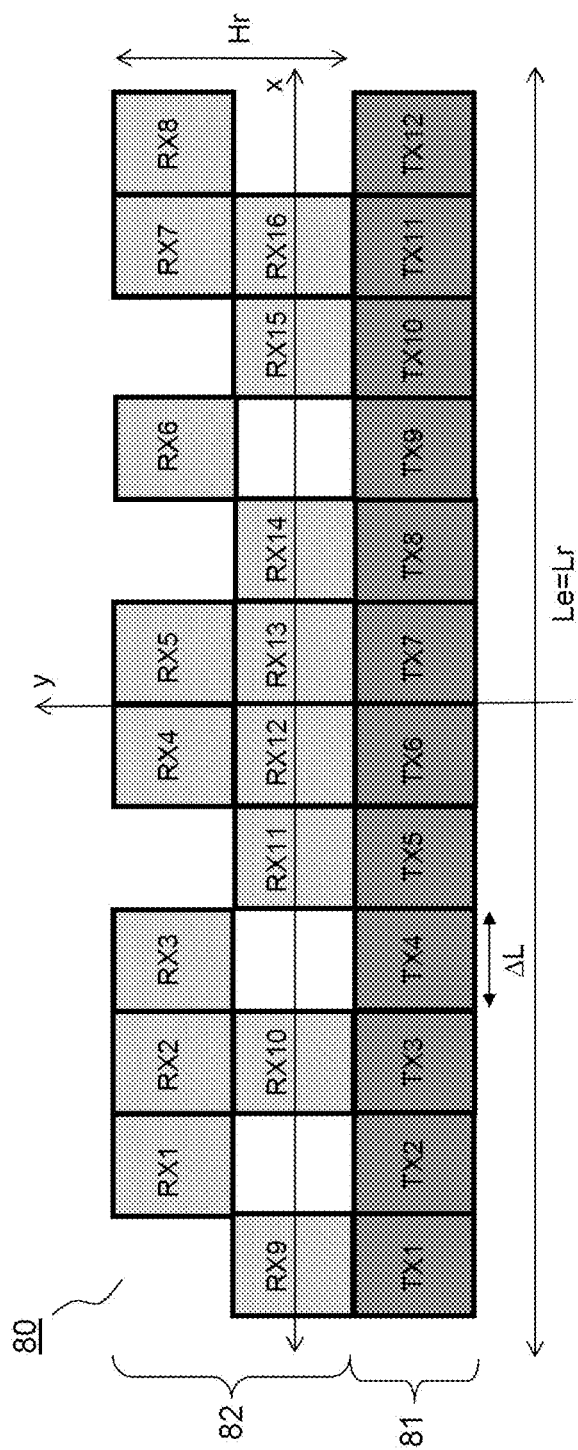

Other features and advantages of the invention will become apparent from the following description, given in light of the attached drawings which represent:

FIG. 1, an illustration of the principle of operation of an antenna of ASEA type;

FIG. 2, an illustration of the principle of operation of an antenna of MIMO type;

FIG. 3a, an example of solid antenna array;

FIG. 3b, a first example of antenna array with gaps in transmission and solid in reception;

FIG. 3c, a second example of antenna array with gaps in transmission and solid in reception;

FIG. 3d, an example of antenna array with gaps in transmission and in reception;

FIG. 4, an illustration of the principle of the invention;

FIG. 5a, an illustration of the antenna gain with two adjacent pointing beams;

FIG. 5b, an illustration of the antenna gain with beam overlap in the case of oversampling;

FIG. 6a, in combination with FIG. 6b, an illustration of the improvement in contrasts between two extended media, FIG. 6a representing the case without oversampling;

FIG. 6b, a representation of the case with oversampling;

FIG. 7, an illustration of an application in which the temporal distribution of the pointing directions is not uniform;

FIG. 8, an example of realization of an active antenna used by the radar according to the invention.

The solution according to the invention is based on an active antenna architecture, which can be a conventional electronic scanning antenna of AESA (Active Electronic Scanned Array) type or an antenna of MIMO type. FIGS. 1 and 2 respectively recap, by simplified representations, the structure of an AESA antenna and of a MIMO antenna.

In the ASEA structure illustrated by FIG. 1, each radiating transmission and reception element 1 is connected to a microwave module 2 which performs, by switching 21, 22, both the transmission 23 and the reception 24. The microwave modules are hereinafter called TR modules (transmission and reception modules). To perform the abovementioned functions, a TR module comprises power amplification means 23 (HPA), low-noise amplification means 24 in reception (LNA). It also comprises phase-shifters 25, 26 for phase-shifting the transmission signal and for phase-shifting the reception signal on each individual channel. The phase-shifters are controlled by digital control means that are not represented. The TR modules 2 are linked to a transmission and reception assembly 10 notably comprising the wave generations and the analog-digital conversion circuits. The digital controls of the phase-shifters can be situated in this assembly 10.

In the MIMO structure illustrated by FIG. 2, the transmission radiating elements 1' are separated from the reception radiating elements 1" unlike in the AESA case in which one and the same radiating element is used in transmission and in reception. A transmission radiating element 1' and a reception element 1" are therefore associated respectively with a transmission module 2' and with a reception module 2". Each transmission module 2' comprises a power amplifier 23' and a phase-shifter 25'. Each reception module 2" comprises a low-noise amplifier 24" and a phase-shifter 26". The phase-shifting in reception is, preferentially, performed digitally after analog-digital coding of the reception signal. The transmission and reception modules are linked to a transmission and reception assembly 10' similar to that of FIG. 1. In a configuration of MIMO type as illustrated by FIG. 2, the transmission and the reception can be simultaneous.

In one or other of these two configurations, the invention implements a multichannel architecture in transmission and in reception, in which, for each transmitted pulse, a focusing in a different direction of space from pulse to pulse, and a digital beam-forming in reception of at least one beam in the focusing direction is performed by phase-shifting of the transmission channels. According to the invention, the pointing directions can be sequenced in any order, according to a uniform or non-uniform spatial distribution, on one plane or on two planes.

For the implementation of the invention, an active antenna radar is considered, composed of an array antenna of N channels in transmission and M channels in reception. In the particular case of an AESA antenna with active modules, M=N. Each transmission and reception channel comprises an antenna subarray (composed of a given number of radiating elements) whose angular aperture corresponds to the overall coverage range of the radar. For example, in the general case of a 2D antenna, the aperture in a first plane is denoted hex and, in the second plane, at right angles to the first, is denoted hey. These angles correspond typically to the angular aperture in the horizontal plane and in the vertical plane (or circular angle and elevation angle). The transmission of the radar is composed of a succession of bursts, which are themselves composed of a number P of successive recurrences, the duration of a burst corresponding to a processing cycle time T necessary to cover the detection range of the radar. The transmission can be pulsed, continuous or quasi-continuous, for example in the case of an FMCW radar.

FIGS. 3a, 3b, 3c and 3d present several antenna array configurations. The latter can be solid, with gaps in transmission, with gaps in reception or with gaps in transmission and in reception.

FIG. 3a presents a solid antenna array composed of transmission subarrays 31 and of reception subarrays 32 disposed on the surface of the antenna. Hereinbelow, TX will denote the transmission subarrays and RX the reception subarrays. In the case of a solid array, the subarrays are all adjacent to one another. FIG. 3a presents a solid array in transmission and in reception composed, by way of example, of two rows of TX subarrays and three rows of RX subarrays, the antenna as a whole comprising eight columns of subarrays.

FIG. 3b presents an array with gaps in transmission and solid in reception. In this example, the space between two consecutive non-adjacent TX subarrays is a multiple of a given wavelength, this given length being equal to the width of a subarray in the example of FIG. 3b.

FIG. 3c also presents an array with gaps in transmission and solid in reception, but, in this example, the space between two consecutive non-adjacent TX subarrays is not a multiple of a given wavelength.

FIG. 3d presents an array with gaps in transmission and in reception (the transmission subarrays TX and the reception subarrays RX here being able to be interleaved), in which the space between consecutive non-adjacent subarrays is a multiple of a given wavelength.

In practice, the position of the transmission and reception antennas is optimized to make it possible to form focused beams by phase-shifting of the different transmission and reception channels over all the coverage range defined by $\Delta\theta_x$ according to x (defining the horizontal plane) and by $\Delta\theta_y$ according to y (defining the vertical plane) with the lowest possible level of side lobes or ambiguous lobes. Moreover:

if Le is the length of the antenna according to x and He is its length according to y in transmission;

and if Lr is the length of the antenna according to x and Hr is the length of the antenna according to y in reception, the focusing makes it possible to obtain an angular resolution in radians substantially equal to $\lambda/Le$ and $\lambda/Lr$ respectively in transmission and in reception on the axis x and equal to $\lambda/He$ and $\lambda/Hr$ respectively in transmission and in reception on the axis y, $\lambda$ being the operating wavelength of the radar. In the particular case of FIG. 3d, Le=Lr and He=Hr. The type of array used, with gaps or not, is notably a function of the number of transmission and reception channels at disposal and of the desired angular coverage sought. The methods for optimizing the various parameters, and notably the disposition of the subarrays, are known to the person skilled in the art and can be implemented by simulation.

FIG. 4 illustrates the principle of the invention. According to the invention, the angular range to be covered by the radar is broken down into a given number $D_e$ of pointing directions in transmission, according to a beam resolution of the order of $\lambda/Le$ on the axis Ox and of $\lambda/He$ on the axis Oy. The transmission of the radar is controlled so as to:

radiate successively in the $D_e$ pointing directions $d_{ei}$;

by changing direction from pulse to pulse 41, that is to say from recurrence to recurrence 42;

during a pointing cycle 43 comprising P recurrences of duration Tr, then repeat the operation according to C successive pointing cycles.

The set of these cycles 43 constitutes a detection block 44 of duration T, corresponding to a burst R of C×P recurrences. In the example of FIG. 3, three cycles are represented. In a given recurrence, the antenna beam is focused in a direction $d_i$ and, in the next recurrence, it is focused in another direction $d_{ei+1}$, thus performing an electron scanning pass from one recurrence to another (or from one pulse to another). That notably advantageously makes it possible to cover a wide range with a low revisiting time because of the change of beam direction from pulse to pulse.

It should be noted that the successive pointing directions di can be chosen in any order for a given pointing cycle. In the example of FIG. 4, the order of the directions can be any order with respect to the angles of the pointing directions. In other words, the orders 1, 2, . . . i . . . P of activation of the directions (corresponding to the orders of recurrences) do not coincide with the successive values of the directions.

The directions are represented the same from one cycle to another in FIG. 4, but this is not essential. The order of the directions within the cycles can also be modified from burst to burst. This possibility is notably advantageous for limiting the risks of interference with other radars or communication equipment operating in the same frequency band.

Moreover, the angular spacing between the different pointing directions can be less than the angular resolution of an individual beam to produce an oversampling of the angular range covered. That makes it possible notably to limit the scanning losses to the spot echoes and favor the detections of contrast between two extensive media, uniform but exhibiting a different reflectivity.

FIGS. 5a and 5b illustrate the limitation of the scanning losses on the spot echoes. More specifically, FIGS. 5a and 5b illustrate the antenna gains as a function of the angle θ, respectively in the case of adjacent beams without oversampling and in the case of adjacent beams with oversampling. A beam 51 points in a direction $d_{ei}$ and its adjacent beam 52 points in a direction $d_{ej}$.

In FIG. 5a, the maximum antenna gain $G_{MAX}$ is in the directions $d_{ei}$ and $d_{ej}$, the minimum antenna gain is in the direction $d_c$, the direction of the target 51. There is a gain loss $\Delta G$ in the direction of the target. In FIG. 5b, an additional beam 54 points in the direction $d_c$ by partially covering the two adjacent beams. This oversampling makes it possible to obtain a maximum gain $G_{MAX}$ in the direction $d_c$ of the target. It should be noted that the beams 51, 52, 53 are represented as static, bearing in mind that they are not transmitted at the same time, a single beam being transmitted at a time.

FIGS. 6a and 6b illustrate the improvement of contrasts between two extensive media. More particularly, these figures present an example showing the benefit of the angular oversampling when seeking to detect the position of the boundary between two media that are relatively uniform and of different reflectivities, typically between grass 61 and tarmac 62. This is a case of application, for example, of an airborne landing assistance radar whose function is to detect the outline of the landing runway. This is also the case, for example, of an embedded automobile radar seeking to detect the edges of the road in front of a vehicle.

FIGS. 6a and 6b present this example, respectively without and with angular oversampling, the radar being in a position 60. In the case of FIG. 6a, the beams transmitted are adjacent, a first beam $F_i$ pointing in a direction di and a second beam $F_j$ pointing in a direction dj. In this configuration, two adjacent radar resolution cells 63, 64 have a high probability of containing reflections originating from both of the two different media 61, 62. That makes it difficult to detect the boundary between the two media 61, 62. In the case of FIG. 6b, a beam $F_k$ partially covers the beams $F_i$ and $F_j$. In this configuration with angular oversampling, the probability of two adjacent radar resolution cells 65, 66 containing only reflections coming from one and the same medium increases, which favors the detection of the boundary between the two media 61, 62. As for FIGS. 5a and 5b, the beams are represented as static even though they are never transmitted at the same time.

The temporal distribution of the pointing directions can be non-uniform, so as to differentiate the range balance according to the viewing angles. This property is notably of interest in the case of a radar seeking to image a relatively rectangular zone with grazing incidence. This is, for example, the case of an anticollision radar for an automobile or even of an airborne radar for the EVS function. In both cases, the zone to be imaged is substantially rectangular and corresponds typically to the cases of application of FIGS. 6a and 6b taken up again by FIG. 7.

FIG. 7 therefore presents a radar positioned at a point 60 pointing its beams toward two relatively uniform different media 61, 62, for example a landing runway (or a road) crossing a zone covered with grass. In this example, the transmitted beams are not constant in range. Three beams transmitted at different instants are represented. Among these beams, two beams $F_i$, $F_j$ have the same range, and a third beam $F_m$ has a greater range. The detection range requirement is a distance D1 for the beams $F_i$, $F_j$, the range needed to detect the closest edge of the rectangle composed of the two media 61, 62 (bottom edge in the figure). The beam $F_m$ covers the central medium 62, for example a landing runway. The detection range requirement for this beam $F_m$ is a distance D2 that makes it possible to cover all the medium 62, for example the landing runway, or at least the greatest possible length of this medium. To this end, the range D2 reaches the furthest edge of the rectangle (top edge in the figure).

By considering, for example, a ratio D1/D2=1/2, the radar sensitivity requirement is 12 dB lower with the strong misalignments than in the axis of the antenna of the radar, and the integration gain of the radar can be reduced typically in a ratio of 16 in the case of a coherence integration. The total illumination time for the beams Fi and Fj can in this case be reduced by a factor of 16 by comparison to the illumination time of the beam Fm. Thus, according to the invention, during a detection interval of duration T, the number of repetitions of the pointings of the antenna in a given direction can be optimized according to the sensitivity sought.

Having described the transmission principle, the reception principle will now be discussed. In reception, the radar processing performs, on each recurrence of duration Tr, the forming of at least one beam in the direction of transmission.

This operation can be performed by analog means, by summing of the reception channels after phase-shifting, or digitally, after analog-digital coding, according to the methods known to the person skilled in the art. In the latter case, the beam forming occurs before or after suitable processing and separation of the received signals on the distance axis.

In all cases, the beam-forming in reception is performed on each recurrence, that is to say before integration processing over the duration T of a burst corresponding to C×P recurrences. The beam-forming can be performed on all the receivers in a single operation, or by dividing the antenna into different quadrants each composed of a part of the reception channels, for example when wanting to perform a single-pulse angle error measurement processing.

After beam-forming in reception and suitable filtering on the distance axis, the received signal is broken down according to a certain number of distance cells covering the instrumented range of the radar. The integration processing is then applied for each distance cell over the duration of the burst, for each of the pointing directions in transmission and in reception.

Typically, the radar is a doppler radar. The integration is coherent over the duration of the detection interval and is performed by spectral breakdown of FFT or DFT type.

The principles described can however be applied to a non-coherent integration, typically for a non-doppler radar, by replacing the FFT processing with a post-integration according to methods known to the person skilled in the art.

Hereinbelow, only the case of a coherent integration by FFT processing is discussed, considered as a particular mode of application of the invention.

FIG. 8 presents an exemplary embodiment of a radar according to the invention, showing its active antenna composed of a set of transmission subarrays 81 and of reception subarrays 82 disposed on the horizontal axis Ox and on the vertical axis Oy, a transmission subarray being associated with a transmission channel and a reception subarray being associated with a reception channel. The radar comprises a number N of transmission channels and a number M of reception channels. The transmission and reception antennas are all identical, they have an angular aperture $\Delta\theta x$ on the axis Ox and an angular aperture $\Delta\theta y$ on the axis Oy.

These subarrays are distributed, for example, over a total length Le=Lr on the axis Ox and over a height He+Hr on the axis Oy according to the representation of FIG. 8, in which N=12 and M=16. In this example, the antenna therefore comprises a row of 12 transmission subarrays of height He and two rows of 8 reception subarrays of height Hr, such that Hr=2He. The antenna has gaps in reception, the reception subarrays being disposed optimally to obtain a given coverage according to methods known to the person skilled in the art.

Thus constructed, after focusing, the antenna array has an angular resolution:
  in transmission, substantially equal to $\lambda/Le$ in the horizontal plane and $\lambda/He$ in the vertical plane;
  in reception, substantially equal to $\lambda/Le=\lambda/Lr$ in the horizontal plane and $\lambda/Hr=\lambda/2He$ in the vertical plane.

The repetition period of the radar is equal to Tr and the duration of a burst is set at T, a burst comprising C cycles of P recurrences. In the embodiment of FIG. 8, P=16 and C=32, i.e. 32 cycles of 16 recurrences. Still in the exemplary embodiment of FIG. 8, the scanning is performed only in the horizontal plane according to a number $D_e$ of successive directions within an angular range of extension $\theta x$, with $D_e=16$.

According to the rules known to the person skilled in the art, the focusing of the beam in transmission in the direction $de_i$ corresponding to the angle $\theta e_i$ (pointing angle in the horizontal plane with respect to the normal to the antenna plane) is obtained by applying a phase-shift $\Delta\psi e_i$ to the transmission between two adjacent transmission subarrays TX on the axis Ox, such that:

$$\Delta\psi e_i = \frac{2\pi\Delta L\sin(\theta e_i)}{\lambda} = \frac{2\pi\sin(\theta e_i)}{\Delta\theta x}$$

in which $\Delta L$ is the distance between the phase centers of two adjacent TX subarrays on Ox and $\lambda$ is the wavelength of the radar. By choosing, for example, a distribution of the pointing directions in transmission that is uniform in direction sine in the angular range corresponding to $\Delta\theta x$:

$$\sin(\theta e_i) = \frac{i\Delta\theta x}{D_e} = \frac{i\Delta\theta x}{16} = \frac{12}{16}i\frac{\lambda}{Le} = \frac{3}{4}i\frac{\lambda}{Le} \text{ and}$$

$$\Delta\psi e_i = \frac{2\pi i}{D_e} = \frac{2\pi i}{16}$$

The angular range is oversampled in transmission by a factor 4/3, and the individual angular displacement pitch is set by:

$$|\sin(\theta e_{i+1}) - \sin(\theta e_i)| = \frac{3}{4}\frac{\lambda}{Le}, \text{ corresponding to:}$$

$$|\Delta\psi e_{i+1} - \Delta\psi e_i| = \frac{2\pi}{16}$$

During a same pointing cycle, $\Delta\psi_i$ takes the values 0, $2\pi/D_e$, $4\pi/D_e$, ..., $(D_e-1)\pi/D_e$, i.e. in our example, 0, $2\pi/16$, $4\pi/16$, ..., $15\pi/16$, the different values of $\Delta\psi_i$ being able to follow one another in any order, this order remaining identical during one and the same burst.

On reception, the signal received on each antenna Rx is digitized and, on each recurrence, on the horizontal axis, and on each of the rows of reception subarrays RX, a first phase-shift $\Delta\psi r0_i$ is applied between two adjacent subarrays such that:

$$\Delta\psi r0_i = \Delta\psi e_i$$

to form reception beams in the same direction as the transmission beam.

A second phase-shift $\Delta\psi r_i$ is for example applied between two adjacent subarrays such that:

$$\Delta\psi r1_i = \Delta\psi e_i - \frac{2\pi}{32}$$

to form reception beams in a direction offset substantially by a half angular pitch in delay with respect to the transmission direction, and for example a third phase-shift is applied between two adjacent subarrays $\Delta\psi r_i$, such that:

$$\Delta\psi r2_i = \Delta\psi e_i + \frac{2\pi}{32}$$

to form reception beams in a direction offset substantially by a half angular pitch in advance with respect to the transmission direction.

The method is intended to angularly oversample in reception the beams formed on transmission. In this example, the oversampling rate is 3, the three beams being formed in the directions corresponding to:

$$\sin(\theta e_i) = \frac{3}{4}i\frac{\lambda}{Le}$$

$$\sin(\theta e_i) - \frac{3\lambda}{8Le}$$

$$\sin(\theta e_i) + \frac{3\lambda}{8Le}$$

After phase-shifting of the reception signals, the radar processing performs the single-pulse beam-forming according to the technique known to the person skilled in the art. A sum channel is obtained by performing the amplitude and phase summing of all the signals received on the M=16 receivers, for each of the phase-shifts:

$$\Delta\psi r0_i, \Delta\psi r1_i \text{ and } \Delta\psi r2_i$$

An elevation difference channel is obtained by obtaining the row-by-row amplitude and phase difference of the sums of the signals received on each of the two rows of M/2=16 receivers, for each of the phase-shifts:

$$\Delta\psi r0_i, \Delta\psi r1_i \text{ and } \Delta\psi r2_i,$$

according to the following operation:

$(RX1+RX2+RX3+RX4+RX5+RX6+RX7+RX8)-(RX9+RX10+RX11+RX12+RX13+RX14+RX15+RX16)$.

An azimuth difference channel is obtained by obtaining the amplitude and phase difference between the sums of the signals received on each of the two left and right halves of the antenna of M/2=16 receivers, for each of the phase-shifts:

$$\Delta\psi r0_i, \Delta\psi r1_i \text{ and } \Delta\psi r2_i,$$

according to the following operation:

$(RX1+RX2+RX3+RX4+RX9+RX10+RX11+RX12)-(RX5+RX6+RX7+RX8+RX13+RX14+RX15+RX16)$.

On each recurrence of rank i of the cycle of index k, corresponding to the pointing direction in transmission according to $\sin(\theta e_i)$, there are thus three sum beams, corresponding to the transmission reception beam forming, denoted respectively:

$\Sigma_0(\theta e_i, k)$ for the pointing according to $\sin(\theta e_i)$;

$$\sum 1(\theta e_i, k) \text{ for the pointing according to } \sin(\theta e_i) - \frac{3\lambda}{8Le};$$

$$\sum 2(\theta e_i, k) \text{ for the pointing according to } \sin(\theta e_i) + \frac{3\lambda}{8Le}.$$

Likewise, there are three elevation difference beams, respectively denoted:

$\Delta el_0(\theta e_i, k)$ for the pointing according to $\sin(\theta e_i)$;

$$\Delta el_1(\theta e_i, k) \text{ for the pointing according to } \sin(\theta e_i) - \frac{3\lambda}{8Le};$$

$$\Delta el_2(\theta e_i, k) \text{ for the pointing according to } \sin(\theta e_i) + \frac{3\lambda}{8Le}.$$

And three azimuth difference beams, respectively denoted:

$\Delta az_0(\theta e_i, k)$ for the pointing according to $\sin(\theta e_i)$;

$$\Delta az_1(\theta e_i, k) \text{ for the pointing according to } \sin(\theta e_i) - \frac{3\lambda}{8Le};$$

$$\Delta az_2(\theta e_i, k) \text{ for the pointing according to } \sin(\theta e_i) + \frac{3\lambda}{8Le}.$$

The suitable filtering and the breakdown of the signals into Ned distance cells are then performed so as to constitute 9 vectors corresponding respectively to the sum $\Sigma(\theta e_i, k)$, elevation difference $\Delta_{el}(\theta e_i, k)$ and azimuth difference $\Delta_{az}(\theta e_i, k)$ channels on each recurrence, for the three pointing directions in reception. The elements of these vectors correspond to an amplitude and phase coded signal, in each of the Ned distance cells for the pointing direction concerned.

This operation is repeated for the $D_e$ pointing directions, for each of the C=32 pointing cycles constituting a burst. By this method, every C=32 recurrences, the same beams are formed in the same directions:

at the time iTr corresponding to the recurrence i of the cycle 1, 9 vectors $\Sigma(\theta e_i, 1)$, $\Delta_{el}(\theta e_i, 1)$, $\Delta_{az}(\theta e_i, 1)$;

then at the time $(i+P)T_r=(i+16)T_r$ corresponding to the recurrence i of the cycle 2, 9 vectors $\Sigma(\theta e_i,1)$, $\Delta_{el}(\theta e_i,1)$, $\Delta_{az}(\theta e_i,1)$;

then, at the time $(i+kP)T_r=(i+16k)T_r$ corresponding to the recurrence i of the cycle k, 9 vectors $\Sigma(\theta e_i,1)$, $\Delta_{el}(\theta e_i,1)$, $\Delta_{az}(\theta e_i,1)$;

until the time $(i+CP)T_r=(i+512)T_r$ corresponding to the recurrence i of the cycle 32, 9 vectors $\Sigma(\theta e_i,1)$, $\Delta_{el}(\theta e_i,1)$, $\Delta_{az}(\theta e_i,1)$.

Then, for each beam formed, a coherent integration by FFT is performed on 32 points, term by term, for each element of the series of matrices:

$$\Sigma(\theta e_i,k), \Delta_{el}(\theta e_i,k), \Delta_{az}(\theta e_i,k).$$

This operation corresponds to a doppler processing. The result of this operation is a 2 D distance/doppler matrix representing the amplitude and the phase of the signal received after coherent integration, this duly constituted map comprises Ncd distance cells and 32 speed filters for each sum beam $\Sigma$, elevation difference beam $\Delta_e$ and azimuth difference beam $\Delta_{az}$, and for each of the three TX/RX pointing directions.

By repeating the operation for all the transmission directions, there is finally obtained a distribution of the received signals according to Ncd distance cells, C=32 speed filters and 3De=48 pointing directions in transmission/reception, for a sum channel, an elevation difference channel and an azimuth difference channel.

From these results and by performing an arrangement of the data according to a monotonic progression of the pointing directions, it is finally possible to extract, for each speed filter:

a matrix representing the complex signal at processing output on the sum beam, as a function of the distance cell and of the direction sine for the 48 transmission/reception pointing directions;

a matrix representing the complex signal at processing output on the elevation difference beam, as a function of the distance cell and of the direction sine for the 48 transmission/reception pointing directions;

a matrix representing the complex signal at processing output on the azimuth difference beam, as a function of the distance cell and of the direction sine for the 48 transmission/reception pointing directions.

From these three matrices, the detection of the targets is performed for example by amplitude thresholding, or by any other known method, and the angular position of the targets detected is refined in the elevation and azimuth planes by single-pulse angle error measurement, which makes it possible to produce a refined 2D or 3D image of the scene, depending on the application targeted.

Advantageously, the invention can be implemented by different types of radars. In particular, the radar can be realized in millimetric waves, for example from MMIC modules notably developed for automobile radars, these modules each comprising several transmission channels TX and several reception channels RX.

The invention claimed is:

1. A radar imaging method using an active antenna comprising N transmission channels and M reception channels, transmitting in bursts of pointing cycles, characterized in that said antenna covering a given angular range during a detection time unit of duration T, said time unit corresponds to a burst in which the N transmission channels are focused successively in a number $D_e$ of pointing directions (di) such that:

the pointing direction in transmission is modified from recurrence to recurrence;

each time unit of duration T comprising a periodic repetition of a number C of identical pointing cycles, each of these cycles comprising a number P of recurrences, the set of these P recurrences covers all the $D_e$ pointing directions;

at least one beam is formed in reception on each recurrence in a direction included in the angular range focused in transmission in the pointing direction corresponding to said recurrence, the set of C cycles constituting a detection block of duration T.

2. The method as claimed in claim 1, characterized in that the angular spacing between two pointing directions in transmission $(d_{ei}, d_{ej})$ that are angularly adjacent is less than the angular aperture of the focused beam in said adjacent directions $(d_{ei}, d_{ej})$.

3. The method as claimed in claim 1, characterized in that, during a pointing cycle, the number of pointings in transmission in a direction $(d_{ei})$ is adjusted as a function of the range needed in that direction.

4. The method as claimed in claim 1, characterized in that, during a pointing cycle, the $D_e$ transmission directions are covered in any order.

5. The method as claimed in claim 1, characterized in that the processing of the signals in reception comprises, on each recurrence, at least successively:

a beam-forming in reception in the pointing direction assigned to said recurrence;

a suitable filtering on the distance axis, the received signal being broken down according to distance cells;

then, for each distance cell and each beam-forming direction in reception, a temporal integration of the signals received over the C successive pointing cycles of one and the same burst.

6. The method as claimed in claim 1, characterized in that several beams are formed in reception for one and the same direction $(d_{ei})$ within a burst.

7. The method as claimed in claim 5, characterized in that the integration of the signals received in each direction over the C successive pointing cycles of one and the same burst is a coherent integration.

8. The method as claimed in claim 5, characterized in that the integration of the signals received in each direction over the C successive pointing cycles of one and the same burst is a non-coherent integration.

9. The method as claimed in claim 6, characterized in that the beams formed correspond at least to a sum channel and to a difference channel.

10. The method as claimed in claim 1, characterized in that, said antenna transmitting toward targets, a single-pulse angle error measurement processing is applied to refine the angular position of said targets.

11. An active antenna radar comprising a number N of transmission channels and a number M of reception channels, characterized in that it is capable of implementing the method as claimed in claim 1.

* * * * *